United States Patent [19]

Lusa et al.

[11] 4,113,073
[45] Sep. 12, 1978

[54] WHEEL CYLINDER

[75] Inventors: George Lusa, Dayton; Thomas P. Mathues, Miamisburg, both of Ohio

[73] Assignee: General Motors Corporation, Detroit, Mich.

[21] Appl. No.: 836,140

[22] Filed: Sep. 23, 1977

[51] Int. Cl.² ............................................. F16D 65/24
[52] U.S. Cl. .................................... 188/364; 29/417; 29/DIG. 47
[58] Field of Search ............... 188/361, 362, 363, 364; 29/412, 417, 557, 558, DIG. 47

[56] References Cited

U.S. PATENT DOCUMENTS

| | | | |
|---|---|---|---|
| 2,057,723 | 10/1936 | La Brie | 188/364 |
| 2,548,903 | 4/1951 | Mueller | 29/417 |
| 2,938,349 | 5/1960 | Britton | 188/364 |
| 3,187,848 | 6/1965 | Shellhouse et al. | 188/364 |
| 3,200,908 | 8/1965 | Budd et al. | 188/364 |
| 3,571,883 | 3/1971 | Doolittle | 29/417 |
| 3,626,580 | 12/1971 | Shakespear | 29/412 |

Primary Examiner—Edward R. Kazenske
Attorney, Agent, or Firm—D. D. McGraw

[57] ABSTRACT

A wheel cylinder body is made from a constant cross section extrusion having a bore forming the working chamber of the wheel cylinder without further finishing of the chamber wall. A block-like step section, formed as part of the extrusion on the outside of the cylinder portion, is drilled and threaded for appropriate inlet and bleeder screw connections, and mounting holes. The inlet and bleeder screw holes intersect the bore so that they do not engage the sealing cups of the wheel cylinder pistons during wheel cylinder operation.

1 Claim, 5 Drawing Figures

WHEEL CYLINDER

The invention relates to a wheel cylinder assembly having a body requiring minimum machining and maximum utilization of material with a very high production rate capability. The cylinder assembly uses a constant cross section extrusion from which the cylinder body is made. The bore forming the pressure chamber of the wheel cylinder is finished, without further work, with a surface finish sufficient for sealing the high brake actuating fluid pressures presently used in wheel cylinders. A constant section block-like step on the outside of the body has mounting holes formed therein which are perpendicular to the cylinder bore. The step also has formed therein the inlet and bleeder screw holes which are drilled angularly toward the axial center of the cylinder so that their points of opening into the bore are at no time during wheel cylinder operation engaged by the piston sealing cups. While the mounting holes may be through a face of the step which is common with the step face where the inlet and bleeder screw holes are provided, the embodiment of the invention which is preferred has the mounting holes spot faced to a depth below that of the inlet and bleeder screw surface section to provide closer proximity between the cylinder bore and the mounting surface and to project the inlet and bleeder screw holes through the backing plate of a drum brake to allow for ease of attachment of the brake hose and bleeding screw. The only machining required is for the inlet and bleeder screw holes and the means of attachment. All assembly and internal parts of the wheel cylinder other than the body are of a conventional design.

IN THE DRAWINGS

Figure 1:
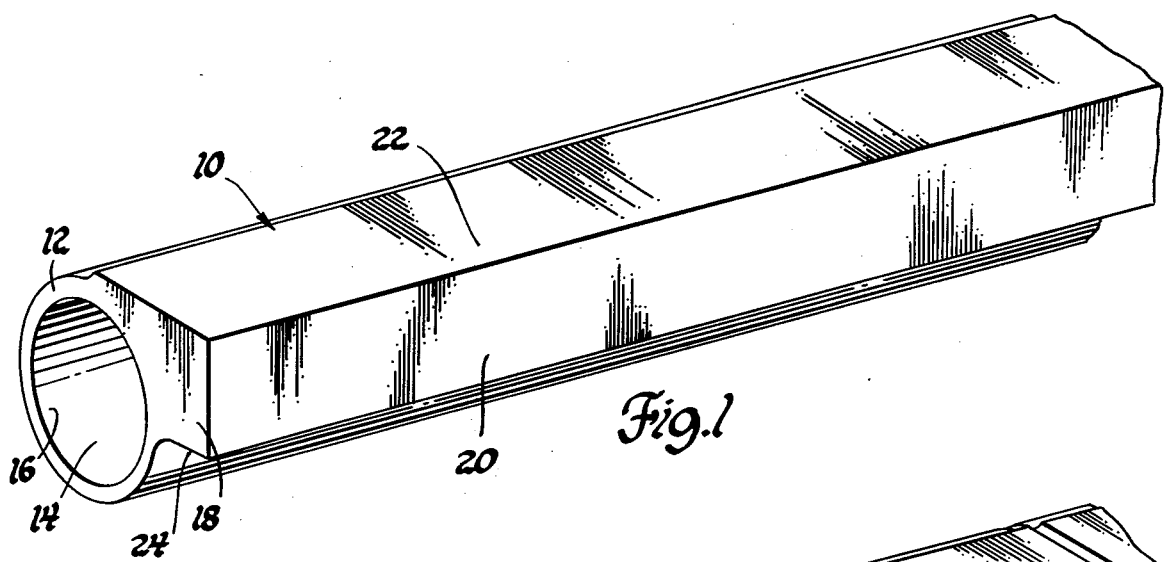
FIG. 1 shows an extrusion in perspective from which several wheel cylinder bodies may be made.

The extrusion 10 of FIG. 1 has a generally annular cylinder section 12 with a bore 14. A surface 16 of the bore is finished during the extrusion operation so as to require no further machining operation to provide a surface which seals pressures delivered to the wheel cylinder. The surface is sufficiently fine to accommodate reciprocal movements of the wheel cylinder pistons and sealing cups without injury thereto. The extrusion 10 has a block-like step or section 18 which extends generally tangentially along one side of the cylinder section 12 and is axially parallel to bore 14. The outer end 20 of step 18 is a flat surface which is parallel to bore 14. The upper surface 22 of step 18 is also parallel to bore 14 and perpendicular to outer end 20. The lower surface 24 of step 18 is parallel to upper surface 22 and is in a plane which passes through bore 14. This plane may intersect the bore axis or may be located to one side of the bore axis. The planes of upper surface 22 and outer end 20 as extended do not intersect bore 14 and preferably do not intersect the cylinder section 12.

Figure 2:
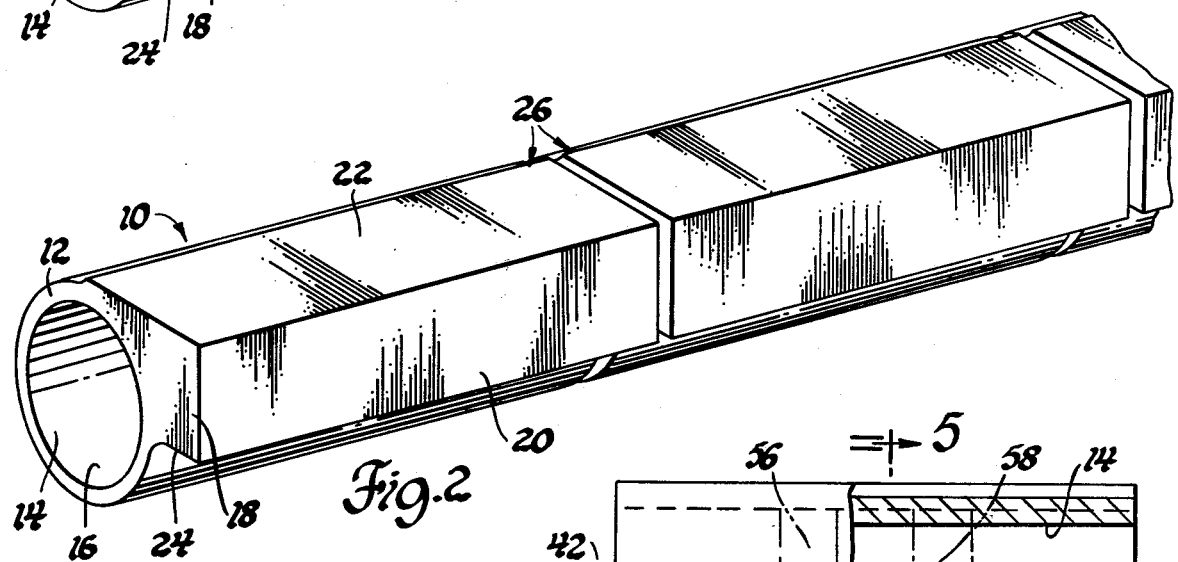
FIG. 2 shows the extrusion of FIG. 1 with sections severed to provide individual wheel cylinder bodies.
Figure 3:
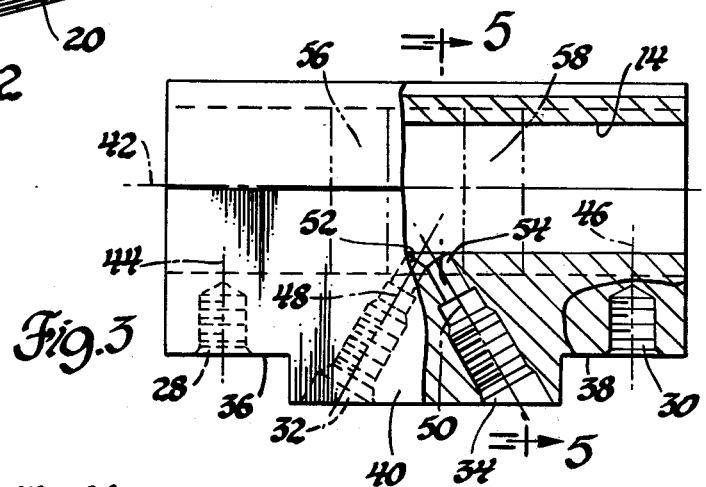
FIG. 3 is a cross section view of one of the extrusion sections forming a wheel cylinder body after machining of the mounting holes and the inlet and bleeder screw holes but before assembly of the internal parts. The axially inward positions which the sealing cups will occupy are illustrated in phantom.
Figure 5:
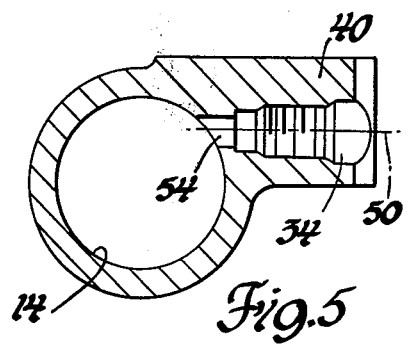
FIG. 5 is a cross section view of the wheel cylinder body of FIG. 3 taken in the direction of arrows 5—5 of that Figure.

The extrusion 10 is cut into sections 26 of appropriate length to provide wheel cylinder bodies, as shown in FIG. 2. The only machining operations required to complete each wheel cylinder body are the drilling and threading of the mounting holes 28 and 30, and the inlet and bleeder screw holes 32 and 34. As shown in FIG. 3, the mounting holes 28 and 30 may be spot faced or recessed so that the outer surfaces 36 and 38 through which they are formed are nearer the cylinder section 12 than is the surface 22 through which holes 32 and 34 are formed. This leaves a boss-like section 40 through which holes 32 and 34 open. The bore axis 42 of bore 14 is illustrated in FIG. 3 to show the relationship of the axes of holes 28, 30, 32 and 34 to the cylinder body, and particularly to bore 14. The axes 44 and 46 of holes 28 and 30, as shown in FIG. 3, are perpendicular to bore axis 42. They do not intersect axis 42, however, as can be seen in FIG. The axes 48 and 50 of holes 32 and 34 extend at an acute angle to bore axis 42 as seen in FIG. 3. They are likewise skew to the bore axis. As more particularly shown in FIG. 5 with regard to axis 50 and hole 34, the inner ends 52 and 54 intersect bore surface 16 on a minor chord of the bore cross section, the intersection approaching a tangential type intersection so as to prevent trapping of any air in the wheel cylinder. The hole inner ends 52 and 54 are closely adjacent each other in relation to their axial positon along bore surface 16, as seen in FIG. 3. This close axially centered position places hole ends 52 and 54 in the wheel cylinder pressure chamber so that they are not engaged by the sealing cups of the wheel cylinder during wheel cylinder operation. The sealing cup positions 56 and 58, shown in phantom in FIG. 3, are the positions of the sealing cups in the wheel cylinder assembly when there is no pressure provided in the pressure chamber. With pressure, the cups move outwardly toward the cylinder body ends.

Figure 4:
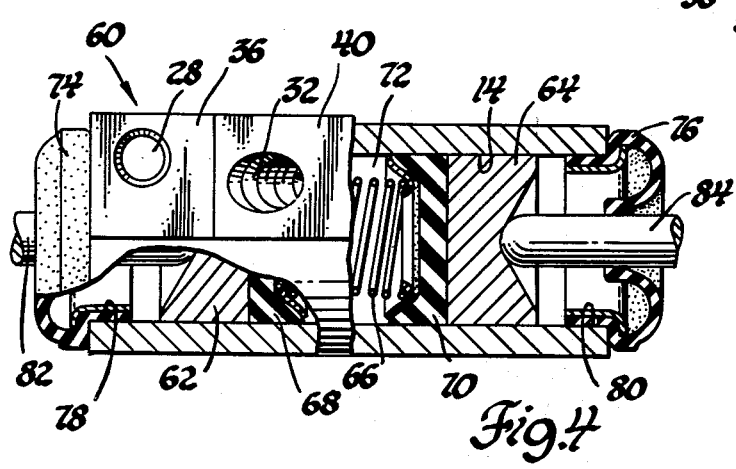
FIG. 4 is a side view, with parts broken away and in section, of a wheel cylinder assembly embodying the invention.

The wheel cylinder assembly 60 is shown in its completed and fully assembled condition in FIG. 4. It has opposed wheel cylinder pistons 62 and 64 reciprocably received in the cylinder bore 14, an expander spring 66 between pistons 62 and 64 and lightly urging the pistons axially apart, and sealing cups 68 and 70 on the adjacent ends of the pistons with the cups and the cylinder bore defining a pressure chamber 72 in which the expander spring 66 is located. Wheel cylinder boots 74 and 76 are on the opposite ends 78 and 80 of the wheel cylinder body and seal the cylinder ends. The particular boots illustrated are internally mounted boots which require no further machining of the wheel cylinder body to provide for their mounting. Wheel cylinder pins 82 and 84 extend through boots 74 and 76 with their inner ends respectively engaging pistons 62 and 64. Their outer ends, when assembled in a wheel brake assembly, engage wheel brake shoes. When brake actuating fluid pressure is applied to pressure chamber 72 through a brake hose attached to an inlet hole, 32 for example, the pistons 62 and 64 move axially outward to displace pins 82 and 84 axially outward to actuate the brake assembly. When hole 32 is the inlet hole, a bleeder screw is secured in hole 34.

What is claimed is:

1. In a brake wheel cylinder assembly comprising a cylinder body having a cylinder bore formed therein, opposed wheel cylinder pistons reciprocably received in said cylinder bore and having an expander spring therebetween, said pistons having sealing cups on their adjacent ends so that said cups and said cylinder bore define a pressure chamber in which said expander spring is located, a wheel cylinder boot on either end of said wheel cylinder body sealing the cylinder ends, and wheel cylinder pins extending from said cylinder bore with one end of each pin engaging one of said pistons to be moved thereby, said pins extending through said boots; the improvement wherein:

said cylinder body including one tangentially, integrally extending block-like step on one side thereof extending axially parallel to the axis of said bore and extending from about one-fourth of the circumference of the cylinder body, said body being formed from a constant cross section extrusion along the entire extrusion length with a bore surface finish resulting from the extrusion process requiring no further machining operation to provide a bore surface which seals pressures delivered to said pressure chamber and which is sufficiently fine to accommodate reciprocal movements of said pistons and sealing cups without injury thereto;

said block-like step having wheel cylinder assembly mounting holes formed therein adjacent the ends thereof and extending substantially perpendicular but skew to the bore axis, said step further having inlet port and bleeder screw holes formed therein between said mounting holes and in substantially linear alignment therewith along one face of said step, said inlet port and bleeder screw holes having their axes extending angularly toward the bore axis and screw thereto so that they open into said pressure chamber on a minor chord and at axially located points so closely axially centered in said pressure chamber that they are not engaged by said cups during wheel cylinder operation.

* * * * *

UNITED STATES PATENT AND TRADEMARK OFFICE
CERTIFICATE OF CORRECTION

PATENT NO. : 4,113,073
DATED : September 12, 1978
INVENTOR(S) : George Lusa & Thomas P. Mathues It is certified that error appears in the above-identified patent and that said Letters Patent are hereby corrected as shown below:

Column 2, line 21, after "FIG." insert -- 4. --.

Column 4, line 14, delete "screw" and insert therefor -- skew --.

Signed and Sealed this

Twentieth Day of February 1979

[SEAL]

Attest:

RUTH C. MASON
Attesting Officer

DONALD W. BANNER
Commissioner of Patents and Trademarks